United States Patent
Lien et al.

(10) Patent No.: US 11,164,211 B2
(45) Date of Patent: Nov. 2, 2021

(54) SYSTEM AND METHOD FOR ENABLING EFFICIENT DIGITAL MARKETING ON PORTABLE WIRELESS DEVICES FOR PARTIES WITH LOW CAPABILITIES

(71) Applicant: Grandpad, Inc., Santa Ana, CA (US)

(72) Inventors: Scott Lien, Santa Ana, CA (US); Isaac Lien, Santa Ana, CA (US); David Tyler, Orange, CA (US); Ryan Burns, Santa Ana, CA (US); Alan Paul R. Phillips, Market Bosworth (GB)

(73) Assignee: Grandpad, Inc., Santa Ana, CA (US)

( * ) Notice: Subject to any disclaimer, the term of this patent is extended or adjusted under 35 U.S.C. 154(b) by 747 days.

(21) Appl. No.: 14/871,808

(22) Filed: Sep. 30, 2015

(65) Prior Publication Data
US 2016/0098759 A1 Apr. 7, 2016

Related U.S. Application Data

(60) Provisional application No. 62/060,687, filed on Oct. 7, 2014.

(51) Int. Cl.
*G06Q 30/00* (2012.01)
*G06Q 30/02* (2012.01)

(52) U.S. Cl.
CPC ..... *G06Q 30/0267* (2013.01); *G06Q 30/0269* (2013.01)

(58) Field of Classification Search
CPC ........... G06Q 30/0277; G06Q 30/0269; G06Q 30/02; G06Q 30/0267
See application file for complete search history.

(56) References Cited

U.S. PATENT DOCUMENTS 6,032,122 A * 2/2000 Gertner ............ G07B 17/00024
715/772
8,744,878 B1 6/2014 Bierbower et al.
(Continued)

FOREIGN PATENT DOCUMENTS

| CN | 2823799 | 2/2014 |
| WO | WO 2007/020551 | 2/2007 |
| WO | WO 2012012560 | 1/2012 |

OTHER PUBLICATIONS

Khan; Mobile Phone Sensing Systems_ A Survey; IEEE 2013; pp. 402-408; 2013.*

(Continued)

*Primary Examiner* — Radu Andrei
(74) *Attorney, Agent, or Firm* — Rutan & Tucker LLP; Hani Z. Sayed

(57) ABSTRACT

A system and method are provided for managing digital marketing to a multiplicity of consumers by way of portable wireless digital devices. The system comprises a simplified human-device interface stored on the portable wireless digital devices. An instrumentation subsystem collects interaction and behavioral data from the simplified human-device interface. A campaign management subsystem permits digital marketing content to be made available and the display of content options to be defined to operate in a controlled way. An analytics subsystem processes the interaction and behavioral data in accordance with a knowledge the states of each of the consumers to permit controlling marketing content and promotions to the consumer. A display subsystem stored on the portable wireless digital device controls the display of marketing content and promotions at specific locations within the human-device interface. A reporting subsystem reports on the display, response, and financial performance of the marketing content and promotions.

1 Claim, 9 Drawing Sheets

(56) References Cited

U.S. PATENT DOCUMENTS

| | | | |
|---|---|---|---|
| 10,402,914 B2* | 9/2019 | Kuramura | G06Q 10/063114 |
| 10,445,840 B2* | 10/2019 | Pei | G06Q 30/0269 |
| 2002/0107937 A1* | 8/2002 | Lyoki | H04N 1/00973 |
| | | | 709/217 |
| 2005/0097008 A1* | 5/2005 | Ehring | G06Q 30/02 |
| | | | 715/205 |
| 2006/0089373 A1* | 4/2006 | Katzman | A61K 31/4745 |
| | | | 514/295 |
| 2007/0156514 A1* | 7/2007 | Wright | G06Q 30/0257 |
| | | | 705/14.41 |
| 2008/0214153 A1* | 9/2008 | Ramer | G06F 16/9577 |
| | | | 455/414.1 |
| 2010/0058381 A1* | 3/2010 | Begeja | H04N 21/6125 |
| | | | 725/34 |
| 2011/0082711 A1 | 4/2011 | Poeze et al. | |
| 2011/0225002 A1* | 9/2011 | Fackler | G16H 40/67 |
| | | | 705/2 |
| 2011/0258049 A1* | 10/2011 | Ramer | G06Q 30/0273 |
| | | | 705/14.66 |
| 2012/0329432 A1 | 12/2012 | Gupta et al. | |
| 2013/0110636 A1* | 5/2013 | Bott | H04W 4/60 |
| | | | 705/14.64 |
| 2013/0166313 A1* | 6/2013 | Kitfield | G16H 20/30 |
| | | | 705/2 |
| 2014/0006129 A1* | 1/2014 | Heath | G06Q 30/0222 |
| | | | 705/14.23 |
| 2014/0244447 A1* | 8/2014 | Kim | G06Q 30/0643 |
| | | | 705/27.2 |
| 2014/0245160 A1* | 8/2014 | Bauer | H04L 41/22 |
| | | | 715/736 |
| 2015/0039406 A1* | 2/2015 | Dubey | G06Q 30/0269 |
| | | | 705/14.4 |
| 2015/0050626 A1* | 2/2015 | Tully | A61B 5/16 |
| | | | 434/236 |
| 2015/0081888 A1* | 3/2015 | Pham | H04L 63/0236 |
| | | | 709/224 |
| 2015/0178373 A1* | 6/2015 | Smith | H04L 65/1069 |
| | | | 707/722 |
| 2015/0319319 A1* | 11/2015 | Maeda | G06T 11/60 |
| | | | 358/1.13 |

OTHER PUBLICATIONS

Perugini; Anytime, Anywhere_ The Social Impact of . . . ; IEEE 1996; pp. 4-15; 1996.*

Peters; Vision systems and the lives of people with disabilities; University of Namur; 6 pages; 2013.*

European Search Report, dated Feb. 2, 2018 from European Patent Office.

* cited by examiner

SYSTEM AND METHOD FOR ENABLING EFFICIENT DIGITAL MARKETING ON PORTABLE WIRELESS DEVICES FOR PARTIES WITH LOW CAPABILITIES

PRIORITY

This application claims the benefit of and priority to U.S. Provisional Application, entitled "System And Method For Enabling Efficient Digital Marketing On Portable Wireless Devices For Parties With Low Capabilities," filed on Oct. 7, 2014 having application Ser. No. 62/060,687.

FIELD

This invention relates generally to the management and enablement of digital marketing on portable wireless devices for seniors, digital marketing on portable wireless devices for parties with degraded sensory or motor-control capabilities, digital marketing on portable wireless devices for users with limited knowledge or interest in information technology in general, digital marketing on portable wireless devices for users with limited knowledge of the portable wireless device in question, and more particularly to systems and methods increasing digital marketing access and for improving the financial performance of such digital marketing for all such users of compromised capability or interest.

BACKGROUND

Traditional methods of targeted digital marketing depend upon having visibility of rich behavioral data to determine current intent, interests, and needs of consumers. Examples of targeted digital marketing generally include sponsored links on search engines, targeted messages presented alongside digital content being viewed by the consumer, targeted emails, targeted content and music recommendations, targeted telemarketing calls, and the like. In the case of a paid subscription service provided to end-users, targeted marketing may also include serving personalized content and personalized configurations so as to increase satisfaction and engagement with the service, increase retention rates, increase referrals from existing customers to prospects, increase paid usage of specific parts of the service, or anything else that might increase the lifetime value of subscribers. The performance of targeted digital marketing depends upon an ability to present relevant content and promotions to consumers at the moment when they are likely to be most interested, using the most effective format and channel of digital communication. The performance of targeted digital marketing methods are therefore dependent upon understanding the contextual relevance and the timing of any proposed marketing communication or promotion. The broader, deeper and more recent that understanding of the individual consumer is, then the more valuable is the opportunity for such a marketing communication to be made.

Unfortunately, there are subsets of the prospective audience that are significantly under-represented in terms of being able to observe the desired rich, timely, behavioral view to support such targeting. In addition, some of those same audience subsets react negatively to content and communications perceived as unsolicited, react negatively to any added complexity afforded to their digital experience caused by any perceived intrusion, and often place a higher-than-average emphasis on trust when considering purchasing.

Such audience subsets generally include ageing populations of seniors, consumers possessing a general dislike of information technology or find information technology devices difficult to use and understand, consumers with disabilities, or generally poor health. These user groups tend to use digital communication channels less frequently, interact with fewer types of digital content and media, and are often less inclined to use a single device for the majority of all of their communication and content requirements. Some of these user groups also exhibit greatest price-sensitivity to the provision of a wireless digital service because they have low income, or finite, non-replaceable savings.

Moreover, although some of these user groups could also benefit from remote healthcare monitoring, such as for example, blood pressure, heart rate, pulse, blood glucose, body temperature, weight, O2 saturation, peak flow, FEV1, ECG, lung and bowel activities by a healthcare specialist provider, these user groups are often reluctant to use such a service. This reluctance may be due to a patient's perception that the benefit of monitoring their bodily functions is outweighed by the inconvenience of carrying around and being connected to a dedicated digital monitor.

The combination of these factors makes it hard to capture rich behavioral understanding of these users' current needs and interests across a broad range of media and channels, hard to understand any special needs and interests arising from compromised capabilities, hard to market to them within their desired bounds of trust, and hard to provide a service to them within their bounds of acceptable cost. It can also create a challenge for healthcare providers who would like to use remote monitoring to support their service delivery. Current solutions do not address the needs of these consumer groups, and hence their continued and significant under-represented accessibility and value to digital marketers, and online healthcare monitoring services, remains low. What is needed, therefore, is a solution for overcoming the shortfalls of the solutions currently available in the market.

SUMMARY

The present disclosure relates to a system and method for using a portable wireless digital device (PWDD) to enable a wide range of digital media consumption and communications activities for formerly digitally under-represented segments of the potential marketing audience, to enable a convenient capture of rich behavioral data in real time across an integrated set of digital channels for those formerly digitally under-represented consumers, to enable highly relevant marketing communications to be presented in a more trusted context to those formerly digitally under-represented consumers, and to enable a complete digital wireless service to be provided to those consumers in a more cost-effective manner, potentially subsidized or even free of charge.

In some embodiments, a system is provided for enabling and managing digital marketing to consumers via a PWDD, the system including: a configurable subsystem running on PWDDs, an instrumentation subsystem that collects interaction data and behavioral data, and other user-characterizing data, from instrumentation on the PWDDs, a campaign management subsystem that permits digital marketing content to be defined and content options to be made available so as to enable targeting in a controlled way, an analytics subsystem that processes behavioral and other user-characterizing data to permit selection of marketing content or promotions from the available set of such marketing communications in accordance with the knowledge of the individual consumer's state, a display subsystem on the PWDD that controls the display of the selected marketing content and promotions within specific locations on the device interface, a reporting subsystem that reports on the display, response and financial performance of the marketing content activities.

In some embodiments, the system may be configured for integration with various external systems, which include: a wireless network carrier that provides the connected bandwidth between devices to support data transmission, advertising intermediaries such as RTB (Real Time Bidding) exchanges, digital marketing agency systems, one or more digital content provider systems that supply source content from which engaging and relevant content may be curated for individual users or purchased by users, providers of certain types of communication framework that support specific communication modes such as video calling or voice calling, one or more social media networking systems, third party support service providers, billing systems, health monitoring services, other care provider services, third party affective computing systems such as those that provide interactive pets, intelligent agent services such as Siri of Apple Inc™, Amazon's Echo, or Microsoft'S™ Cortana, third party online weather providers such as The Weather Channel, Internet access, IP lookup services, Music download services such as Apple iTunes, digital book download services such as Amazon, and Geodemographic lookup services such as MOSAIC.

In some embodiments, the system may be configured to utilize specific data structures and/or data processing technology to allow control of targeted marketing content in particular locations or within particular interface structures on the PWDD user-interface. In some embodiments, the system may be configured to utilize specific data structures and/or data processing technology to allow control of targeted marketing content in particular locations and structures on the PWDD user-interface using predictions of intent, predictions of expected advertising performance, or predictions of other quantities that in some way characterize the present marketing opportunity as the basis of the control. In some embodiments, the system may be configured to utilize specific data structures and/or data processing technology to allow control of targeted marketing content in particular locations and structures on the PWDD user-interface using a set of rules as the basis of the control. In some embodiments, the set of rules may be combined with predictions of quantities of interest that characterize the marketing opportunities as the basis of the control. In some embodiments, the system may be configured to allow the control and delivery of targeted marketing content to particular locations and structures on the PWDD user-interface in the form of pop-up notifications, targeted emails, targeted photographic content, targeted video content, targeted games content, targeted music or other audio content, and the like. In some embodiments, the system may be configured to allow the control and delivery of targeted marketing content to particular locations and structures on the PWDD user-interface in the form of targeted voicemails that are deposited directly into the subscriber's voicemail box bypassing the need for the PWDD subscriber user to experience the intrusion of an unsolicited incoming voice call. In some embodiments, the system may be configured to allow the control and delivery of targeted marketing content to particular locations and structures on the PWDD user-interface in the form of targeted texts. In some embodiments, the system may be configured to allow notifications of the delivery of new marketing or promotional content on the PWDD Home Screen.

In some embodiments, the subsystem for determining the configuration for a subscriber user's PWDD that will deliver the optimal user experience is based on a set of rules that are applied locally, but which may be periodically updated from a central analytic subsystem. The system may be configured to utilize specific data structures and/or data processing technology to allow prediction of intent, prediction of expected user experience benefit, or prediction of increased user usage arising from specific configuration changes to any given user's PWDD; those predictions being made centrally and based upon understanding arising from a collective data view across multiple end-user devices.

In some embodiments, the system may be configured to restrict incoming communications of certain types and to only allow communications to be accepted on a subscriber user's PWDD from a specified list of authorized sources, such as by way of non-limiting example, a "white list" of authorized sources may be defined. In some embodiments, the system may be configured to allow easy content sharing between authorized users of companion apps and any specific subscriber user's PWDD, where such companion apps support a convenient and low-friction experience for sharing digital content and communicating with those PWDD end-user subscribers. In some embodiments, the system may be configured to automatically propagate updates in user contact information to all parties that have been set up to accept communications from the user whose contact information is being updated. In some embodiments, the system may include a subsystem for initiating and sending notifications to the subscriber users of the PWDDs.

In some embodiments, the system may be configured to allow the remote management of a subscriber user's PWDD service account by authorized third parties such as friends, family or paid support parties. This remote access might permit the maintenance of such aspects of the service as: contact management, making changes to the access rights of authorized (white-list) contacts, ensuring that software updates were made correctly, accessing the user's PWDD in screen-sharing mode to assist the subscriber user with specific tasks or to train them, assisting with the set-up of local WiFi connection to a router, adjusting font-sizes, uploading or associating photos with the PWDD subscriber user's contacts, or any other type of support that the PWDD subscriber may want.

In some embodiments, the system may include a subsystem for providing administrative and management decision support. In some embodiments, the system may include a subsystem for providing analytics and reporting of PWDD subscriber usage behavior. In some embodiments, the system may be configured to accept payments for goods and digital content made via PWDDs and to generate receipts. In some embodiments the cost of the PWDD service may be provided at a subsidized cost to the subscriber user, or may even be provided at no cost, by making a consideration for the expected monetary value contributed from marketing sponsors and participants in the cost to the subscriber user.

In some embodiments the system may enable PWDDs to be configurable and each PWDD may be configured to accommodate the particular capabilities of the subscriber user, by way of example such things may be; using larger font-size for text, employing larger clickable control entities for interacting with the device for users with poor sight or compromised sensory motor-control abilities, employing automated text-captioning (Speech-to-Text) for incoming calls, employing Text-to-Speech to assist in reading text-based content, and other means to enable a more satisfying user experience and encourage deeper and broader use of the device.

In some embodiments the system may use methods that help to build and assist recollection such as employing a game on the PWDD that uses contact information or enhanced contact information to challenge users to recall the names, relationships, birthdays or notable upcoming events relating to family members or friends for example.

In some embodiments the system may provide a communication summary capability on PWDDs whereupon, on demand, the system summarizes all recent historical communications for a PWDD subscriber user with a particular family member or friend over a recent period of time in a way that assists recall, or assists in preparing for a new voice call or assists in preparing for a new communication of another type say. This functionality offers particularly significant benefits for those with diminished memory capability.

In some embodiments, the system may have specific locations for marketing content and advertisements within the user interface of the PWDD. In such embodiments the marketing or promotional content displayed in such locations are controlled by a subsystem that displays content in accordance with rules, or campaign criteria, or predictions, or recommendations, or any combination of these factors.

In some embodiments, the PWDD may connect to external sensors that are used for monitoring vital signs of the subscriber user such as blood pressure, heart rate, pulse, blood glucose, body temperature, weight, O2 saturation, peak flow, FEV1, ECG, lung and bowel activities, or other indicators of health for passing on to a healthcare provider or external monitoring service. In such cases these indicators are captured and sent to the third party healthcare provider or health monitoring service or lifestyle monitoring service or fitness monitoring service over the network.

In some embodiments, the health indicators captured are processed and used as additional descriptors to characterize the interests, needs and context of the PWDD subscriber user being monitored, to provide further insights and accuracy in determining what marketing communications or other digital content may be most relevant or effective.

In some embodiments, the health indicators captured are processed and used as additional descriptors to characterize the interests, needs and context of the PWDD subscriber user being monitored, to provide further insights and accuracy in determining what content may be most relevant or valued at a given time, or how aspects of the configuration may be changed to enhance the PWDD user experience.

In some embodiments, the health indicators captured for the purposes of remote health monitoring are supplemented by the behavioral descriptors that characterize the interests, needs and context of the PWDD subscriber user as expressed through all of their interactions with the PWDD, to provide further insights and accuracy in determining the health state and health-related risks of the PWDD subscriber user.

In some embodiments, the system allows third party advertising systems such as Real Time Bidding (RTB) exchanges to access the marketing and promotional locations on the PWDDs for the purpose of displaying third party advertisements from advertisers who participate in such exchanges.

In some embodiments, the PWDDs may access the network via wireless router or via mobile network service such as that provided by AT&T or Verizon, as needed. In some embodiments, the PWDDs may be preconfigured to access only access the network via one of either wireless router or mobile network service, but not both.

In some embodiments, the PWDDs may have a network configuration manager component that is configured to periodically automatically test the availability of a wireless router and a mobile network service, and to automatically select the service expected to deliver the optimal connection performance. For example, when a PWDD user leaves their house to go into the yard or further afield the PWDD may need to automatically change from wireless router connection to a mobile network service connection. As a continuation of this example; upon return to the house or within connection proximity of the known wireless service, the PWDD could then automatically reconnect to the wireless router and disconnect from the mobile network service if by doing so the service was expected to be more optimal.

In some embodiments, the marketing, advertising or promotional content for display on PWDDs may be directly synchronized with external campaign management systems or advertising systems managed by third parties such as agencies or corporations. In some embodiments, the control of marketing, promotional or advertising content on PWDDs may be controlled by third party marketing partners or marketing sponsors who wish to participate in the marketing and advertising activities, as well as internal marketing administrators and managers. In some embodiments, the performance of the displayed marketing content on PWDDs is presented in a reporting analytics system for marketers to appraise and understand the performance of such content.

In some embodiments, the various incoming digital media that are being directed to specific PWDDs have meta-data defined by an enriching process that involves look-ups to external sources, such as IP Look-up services that can provide indications of such things as connection speed, carrier or ISP, geography, and company name. In some embodiments, the various incoming digital media that are being directed to specific PWDDs have meta-data defined by an enriching process that involves look-ups to external sources, such as Movie Look-up services such as the Internet Movie Database (IMDB) that can provide indications of such things as Genre, Actors, Release Date, Motion Picture Ratings (such as "Parental Guidance"), Plot summaries, directors, and production crew. In some embodiments, the various incoming digital media that are being directed to specific PWDDs have meta-data defined by an enriching process that involves look-ups to external sources, such as Music Look-up services such as Gracenote, Decibel, or Discogs that can provide indications of such things as Genre, Artist or Artists, Release Date, Publishers, Distributors, and Reviews.

In some embodiments, the various incoming digital media that are being directed to specific PWDDs have meta-data defined by an enriching process that involves converting incoming voice or video calls to text and then using text analytics to characterize the communication for example in terms of such things as semantics, sentiment, content classification, length, language, word counts, a translation into a specific language, and summarizing statements. In some embodiments, the various incoming digital media that are being directed to specific PWDDs have meta-data defined by an enriching process that involves extracting the text component of the media and then using text analytics to characterize the communication for example in terms of such things as semantics, sentiment, content classification, length, language, word counts, a translation into a specific language, and summarizing statements. In some embodiments, the various incoming digital media that are being directed to specific PWDDs have meta-data defined by an enriching process that involves extracting the geographical location information associated with the media, should there be any, and using a geodemographic lookup service such as MOSAIC or ACORN to determine the geodemographic segment and segment characteristics associated with that location.

In some embodiments, the various incoming video media that are being directed to specific PWDDs have meta-data defined by an enriching process that involves an automated video classification service such as Weesee to determine some of the characteristics of the video content. In some embodiments, the various incoming digital media that are being directed to specific PWDDs have meta-data defined by an enriching process and are assigned a unique content ID for each piece of digital content. The enriched meta-data descriptors are then stored in a system database for retrieval upon demand using the unique content ID as the reference, whenever such characterizing information is required.

In some embodiments, a set of profile and contextual descriptors are maintained updated periodically or in real time for each PWDD or PWDD subscriber user such that the needs, interests and opportunities for marketing for that PWDD or PWDD subscriber user as understood at the present time can be appraised with accuracy. In some embodiments, a set of profile and contextual descriptors are maintained updated periodically or in real time for each PWDD or PWDD subscriber user such that the present needs, interests and opportunities for marketing for that PWDD or PWDD subscriber user as understood at the present time or recent past can be classified in terms of one or more marketing segments. In some embodiments, a set of profile and contextual descriptors are maintained updated periodically or in real time for each PWDD or PWDD subscriber user such that the present health state, health risks, and health needs for that PWDD or PWDD subscriber user as understood at the present time or recent past can be classified in terms of one or more health states.

In some embodiments, remote access to the system is provided for analysts, statistical modelers, and/or data scientists to enable such parties to manage, regulate or control the marketing targeting or marketing optimization functionality of the system. In some embodiments, remote access to the system is provided for analysts, statistical modelers, and/or data scientists to enable such parties to manage, regulate or control the health monitoring functionality of the system, for example to update algorithms used for the detection of asymptomatic cardiac events such as Atrial Fibrillation, Bradycardia, Tachycardia and Cardiac Pause, or the detection of other health conditions indicative of changes in PWDD user health risk state.

In some embodiments, the system may include a mechanism that enables a PWDD subscriber user to send an email containing a recorded voice-message as an option within the email interface framework. In some embodiments, the system may include a mechanism that enables a PWDD subscriber user to post a comment relating to a piece of social media posted by a family member or friend in the form of a recorded voice-message.

In some embodiments, the PWDD user interface has all interactive icons removed from areas of the screen which might be touched inadvertently during normal holding of the device by the user. In some embodiments, the PWDD user interface is locked-down to hide complex functionality and options from the subscriber user. Such hidden functionality may include things like security and privacy settings, network settings and configuration, hardware and sound, connected devices, language and region settings, and account controls for example.

In some embodiments, weather conditions at the present time or for the day at the home location of any given contact is automatically updated from an external weather provider, such as The Weather Channel, and is displayed alongside an image or name of the contact so that the PWDD subscriber user is always aware of the prevailing weather conditions at the home location of any contact.

In some embodiments, video and image formats of content are modified in a conditioning stage during the transmission process, such that the available resolution of the destination device and available bandwidth are expected to deliver the optimal PWDD user experience.

In various further aspects, the disclosure provides corresponding systems and devices, and logic structures such as machine-executable coded instruction sets for implementing such systems, devices, and methods. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The drawings refer to embodiments of the present disclosure in which.

Figure 1:
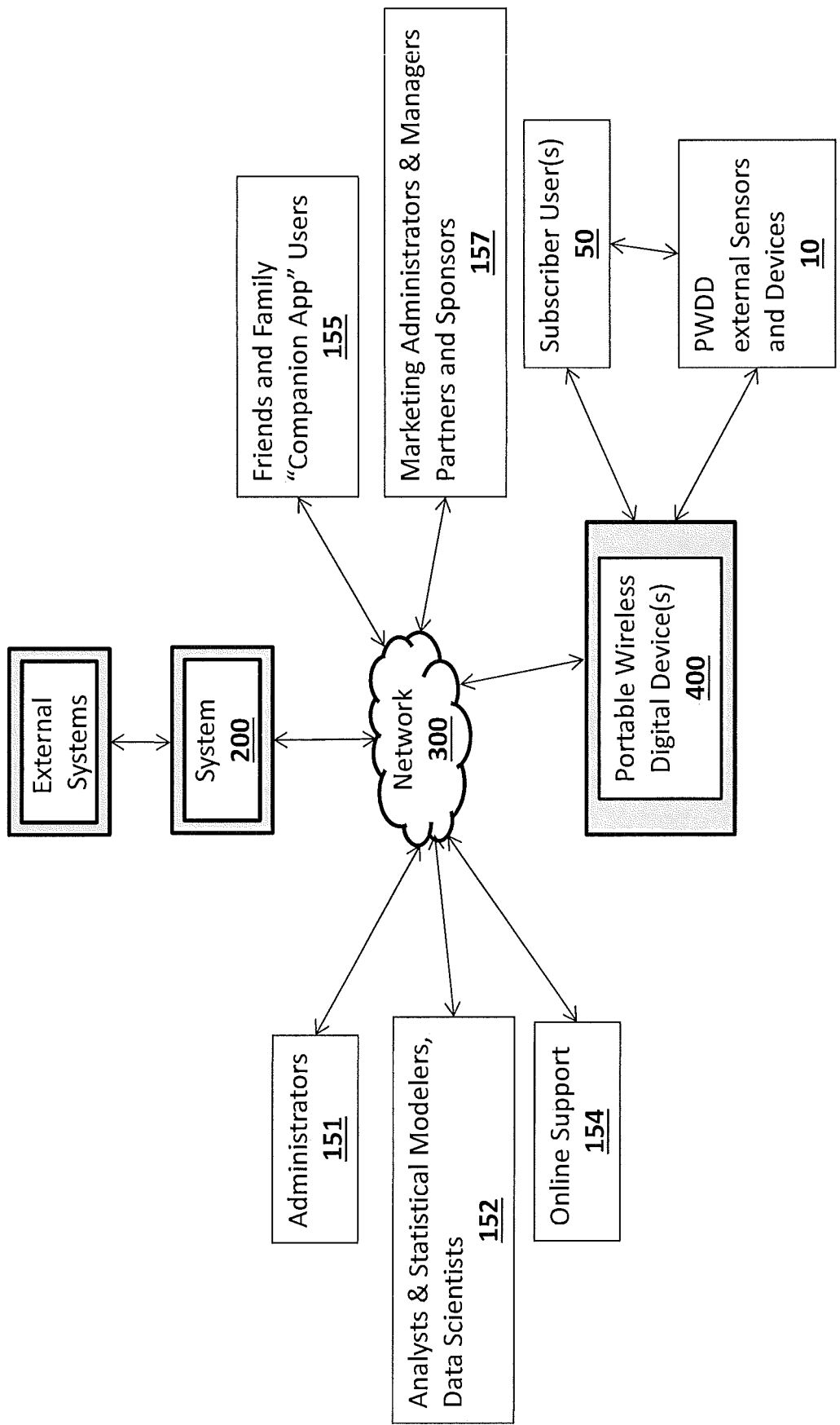
FIG. 1 is a high-level schematic diagram of a digital marketing system, according to the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first element," may be made. However, the specific numeric reference should not be interpreted as a literal sequential order but rather interpreted that the "first element" is different than a "second element." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Preferred embodiments of methods, systems, and apparatus suitable for use in implementing the invention are described by way of reference to the drawings. The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

With respect to computer-implemented embodiments, the description provided may describe how one would modify a computer to implement the system or steps of a method. The specific problem being solved may be in the context of a computer-related problem, and the system may not be meant to be performed solely through manual means or as a series of manual steps. Computer-related implementation and/or solutions may be advantageous in the context of some embodiments; at least for the reasons of providing scalability (the use of a single platform/system to manage a large number of activities); the ability to quickly and effectively pull together information from disparate networks; improved decision support and/or analytics that would otherwise be unfeasible; the ability to integrate with external systems whose only connection points are computer-implemented interfaces; the ability to achieve cost savings through automation; the ability to dynamically respond and consider human-device interface changes in various contexts; the ability to apply complex logical rules that would be infeasible through manual means; the ability to analyze user behavior and make predictions with low latency, the ability to convert information to be communicated to and from PWDD users into digital data for efficient transmission across networks; among others.

Scalability may be useful as it may be advantageous to provide a system that may be able to effectively manage a large number of PWDDs and/or interconnections and/or integration with external systems.

The convenience and effectiveness of the solution may be particularly valuable in the context of digital communications and digital content sharing as certain segments of the population often find some or all modes of such communication and content sharing challenging or unsatisfactory. The convenience and ease of use leads to greater use of digital communications, greater content sharing and content consumption by users and therefore the realization of greater value through those activities.

In general, the present disclosure provides a system and a method for managing digital marketing to a multiplicity of consumers by way of portable wireless digital devices. The digital marketing system comprises a simplified human-device interface presented on the portable wireless digital devices. An instrumentation subsystem is configured to collect interaction and behavioral data from the simplified human-device interface, and collect other characterizing data relating to the PWDD activities. A campaign management subsystem is configured to permit marketing communications and other digital content to be made available and content options to be defined so as to enable targeting in a controlled way. An analytics subsystem is configured to process the interaction and behavioral data in accordance with a knowledge the states of each of the multiplicity of consumers so as to permit controlling marketing communications and other digital content to the consumer. A display subsystem stored on the portable wireless digital device configured to control the display of marketing communications and other digital content at specific locations within the human-device interface. A reporting subsystem configured to report on the display, response, and financial performance of the marketing communications and other digital content.

FIG. 1 is a high-level schematic diagram of a digital marketing system, according to the present disclosure. The stakeholders may include one or more Administrators 151, one or more Analysts & Statistical Modelers, Data Scientists 152, one or more Online Support functionaries 154, one or more Marketing Administrators & Managers, Partners and Sponsors 157, one or more Subscriber Users of PWDDs 50, one or more PWDDs 400, one or more Friends and Family "Companion App" users 155. These stakeholders may interact with the system 200 by way of a communications network 300 in various capacities.

The one or more PWDD Subscriber Users 50 may include any type of person who has a need for a personal communication device that can wirelessly support voice or video calls, or email or text communications, or who has a need for a device for sharing or consuming digital content, or a device for playing games.

The one or more Administrators 151 may include various people who may be tasked with the operating and/or administration of the system, such as people who may be defining and managing integrations with various external systems, managing security, managing networks, managing upgrade processes, managing hardware, managing databases, and other tasks typically required of information technology system administrators.

The one or more Online Support 154 may include various people who may be tasked with supporting the accounts for specific PWDD Subscribers Users for whom they have been given explicit authorization. Such people may be family or friends, or third parties, who may wish to manage contacts for the subscriber, configure aspects of the Subscriber User's PWDD, manage hardware and memory, manage white-lists of authorized sources for the PWDD Subscriber User, manage WiFi connectivity, manage security, manage upgrades, or engage in other account administration activities such that the PWDD user experience is always available with high quality, without interruption, and with minimal system knowledge requirements.

The one or more Analysts & Statistical Modelers, Data Scientists 152 may include various people who may be tasked with supporting data-driven decision-making activities or analytic processes. They may be tasked with exploratory analytics and understanding relationships in the data, capturing some of those relationships as multivariate statistical models, or capturing relationships within machine learning models that update incrementally. Such models may then be used to predict quantities that directly or indirectly support decisions about PWDD configurations for particular Subscriber Users 50 or what digital content or marketing communications would be expected to be most relevant or engaging to a given user at a given moment. Tasks may also include specifying and managing such behavioral models, predictive models, predictive modeling applications, machine learning applications, managing rules and constraints, managing marketing optimization, managing marketing performance reporting, defining and managing the update of profile variables that characterize marketing contexts and other types of state of Subscriber Users, managing recommendation systems, and other data and analytic related tasks.

The one or more "Companion App" Users 155 may include various friends and family members who have an interest in sharing content or communicating with the PWDD subscriber through a special low-friction environment with privileged direct access directly to the subscriber. In a reciprocal manner, similar low-friction privileged access is afforded to the PWDD subscriber to those Companion Apps that are associated with his or her account.

The one or more Marketing Administrators & Managers, Partners and Sponsors 157 may include any of the service provider employees tasked with managing the marketing activities that take place on the PWDDs, monitoring marketing performance, assisting in set-up and management of specific marketing campaigns, the management of the scheduling and content of those campaigns, and the definition of filters, rules and constraints relating to particular campaigns for example. The group may also include Marketing Partners and Sponsors who have authorized access to the PWDD market place for the purposes of planning and deploying their own marketing campaigns.

The one or more PWDD external Sensors and Devices may include external health monitoring equipment used to capture vital health indicators such as blood pressure, heart rate, pulse, blood glucose, body temperature, weight, O2 saturation, peak flow, FEV1, ECG, lung and bowel activities, for third party health monitoring, healthcare providers or lifestyle and fitness service providers such as AMC Health Telemonitoring or Preventice® BodyGuardian® remote monitoring, Jawbone UP™ and Nike FuelBand™. These devices may include wearable devices such as the Apple Watch, Sony SmartWatch, LG G Watch and Samsung Gear that connect to PWDDs for example.

Figure 2:
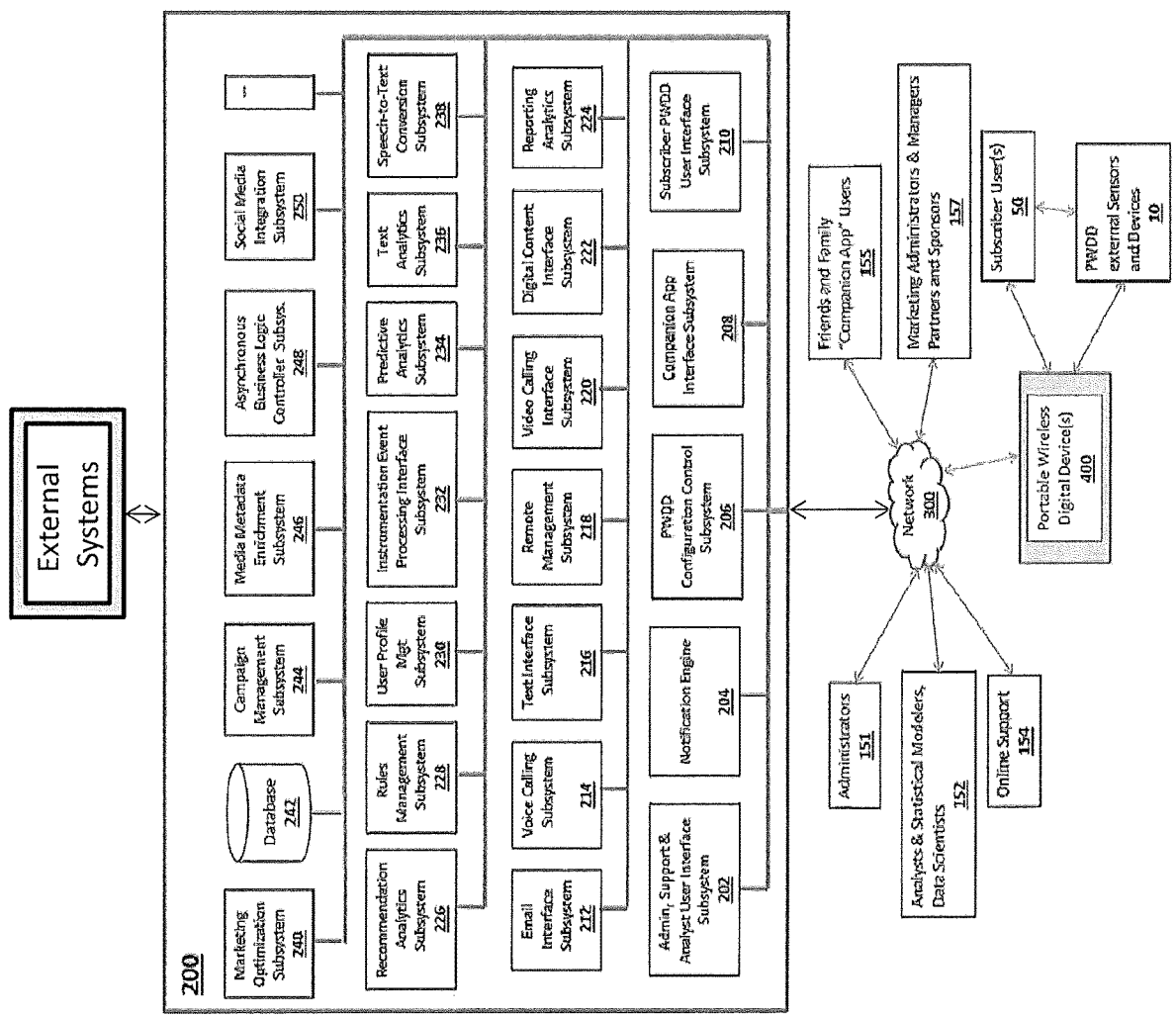
FIG. 2 is a high level schematic diagram illustrating an exemplary embodiment of components comprising a digital marketing system, according to the present disclosure.

FIG. 2 is a high level schematic diagram illustrating an exemplary embodiment of components comprising a digital marketing system 200, according to the present disclosure. The system 200 may be configured to provide a platform that enables and manages efficient communication and content sharing with PWDDs belonging to subscribers, enhanced communication and content sharing between those PWDD subscribers and nominated Friends and Family members, capture of rich behavioral data relating to those PWDD subscribers across a range of supported communication and content sharing modes, analysis of captured behavioral and contextual data from those PWDD subscribers for the purposes of controlling the delivery marketing content into specific interface locations on the subscribers' PWDDs such that the relevance and timing of the marketing is of known quality, the display of the marketing content is controlled to engage rather than intruding and compromising the user experience, and the yield performance of the marketing content is controlled.

The system 200 may include various subsystems, such as an Admin, Support & Analyst User Interface Subsystem 202, a Notification Engine 204, a PWDD Configuration Control Subsystem 206, a Companion App Interface Subsystem 208, a Subscriber PWDD User Interface Subsystem 210, an Email Interface Subsystem 212, a Voice Calling Subsystem 214, a Text Interface Subsystem 216, a Remote Management Subsystem 218, a Video Calling Interface Subsystem 220, a Digital Content Interface Subsystem 222, a Reporting Analytics Subsystem 224, a Recommendation Analytics Subsystem 226, a Rules Management Subsystem 228, a User Profile Management Subsystem 230, an Instrumentation Event Processing Interface Subsystem 232, a Predictive Analytics Subsystem 234, a Text Analytics Subsystem 236, a Speech-to-Text Conversion Subsystem 238, A Marketing Optimization Subsystem 240, a Database 242, a Campaign Management Subsystem 244, a Media Metadata Enrichment Subsystem 246, an Asynchronous Business Logic Controller 248 and a Social Media Integration Subsystem 250.

The various subsystems may be implemented through various electronic and/or computer-implemented means, such as in software and/or in hardware. The subsystems may be instructions performed by one or more processors, at one or more servers. The database 242 may be a non-transitory computer readable medium.

The system 200 may include one or more servers having one or more processors, operating in conjunction with one or more computer-readable storage media, configured to provide backend services, such as data processing, data storage, data backup, data hosting, among others.

Figure 3:
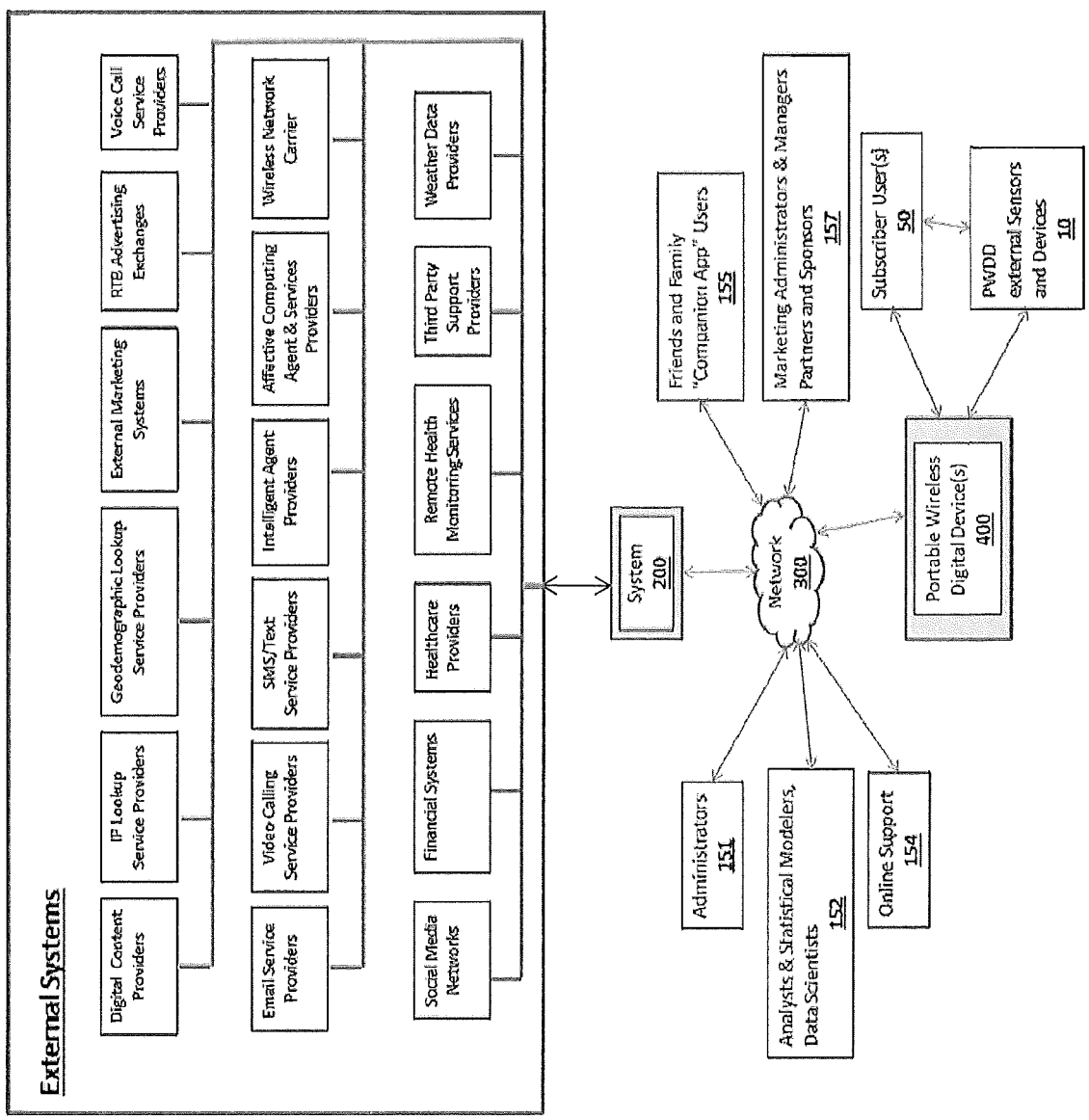
FIG. 3 is a high level schematic diagram illustrating an exemplary embodiment of connections to various external systems in accordance with the present disclosure.

The system 200 may integrate with one or more external systems, as illustrated in FIG. 3. The one or more external systems may comprise Digital Content Providers, for example Apple iTunes or BBC News or subscription services such as the Economist, IP Lookup Services which may give information relating to connection speed, geographical location and commercial entity associated with an IP address, Geodemographic Lookup Services which may give consumer segment information relating to the specific geography in question, External Marketing Systems such as agency marketing systems, RTB Advertising Exchanges that may provide access to the PWDD subscriber inventory for advertisers, Email Service Providers such as Google from where email traffic may originate or to where outbound email may be directed, Video Calling Services such as OpenTok, SMS/Text Service Providers such as those provided by mobile carrier services, Intelligent Agent providers such as Siri of Apple Inc™, Amazon Echo, Microsoft's™ Cortana, Affective Computing Agent and Service Providers to support the interpretation of a PWDD user's emotional state for example, Wireless Network Carrier providers such as AT&T or Verizon for example, Social Media Networks such as Facebook, LinkedIn and Twitter, Financial Systems such as those used for billing of data and calls from carrier networks or payment settlement companies or accounting system providers, Healthcare Providers such as Blue Cross® or Kaiser Permanente®, Healthcare Monitoring Services such as AMC Health Telemonitoring or Preventice® Body-Guardian® remote monitoring, Third Party Support providers who might be paid external support services for particular PWDD subscriber accounts for example, online Data providers.

Interfaces with the external systems may, for example, include an application programming interface (API) that may provide communications means between various machines. An API may be implemented via various technologies, such as Simple Object Access Protocol (SOAP), interfaces developing through exposing functionality using programming code, representational state transfer (REST) adhering programming techniques, etc.

The system 200 may also operate through and/or using one or more networks 300. The one or more networks 300 may include wireless carrier networks, the internet, intranets, point to point networks, etc. Networking technology may include technologies such as TCP/IP, UDP, WAP, etc.

The Remote Management Subsystem 218 may be configured to provide access for Administrators 151 to interact with the PWDDs 400. The access provided to these administrators gives access to low level functionality that is invisible to the PWDD Subscriber Users 50an . . . 50n for the purposes of maintenance, management and troubleshooting. The Administrators may also take control of the subscriber's PWDD for the purposes of understanding subscriber problems or training subscribers to perform new tasks for example. Remote capabilities include: the ability to get stack trace information, to restart, to shutdown, to perform resets of various types, to force synchronization events with other subsystems or External Systems, to flush memory stores dedicated to various tasks, to check battery information, to read signals from PWDD external Devices and Sensors 10, and to simulate any action of the PWDD 400 user as if the user had initiated that action directly. The Remote Management Subsystem 218 communicates with the Remote Management Receiver Subsystem in the PWDD shown in FIG. 4.

The Admin, Support & Analyst User Interface Subsystem 202 enables privileged access rights to certain parts of the System 200 that are not possible through the Subscriber PWDD User Interface Subsystem 210. Maintaining separate access subsystems for administrative users with privileged rights to the System 200 and general PWDD subscribers permits different levels of security to be used for these different types of access.

The Notification Engine 204 can send notifications using different types of notification such as email or text alerts. Such notifications may set up by and sent to Administrators 151, Analysts & Statistical Modelers, Data Scientists 152, Online Support personnel 154, certain nominated Companion App Users 155, Marketing Administrators & Managers, Partners and Sponsors 157, and PWDD subscribers 50 when certain types of operating condition or PWDD subscriber behaviors occur. The Notification Engine therefore enables automated monitoring and alerting when sets of operating conditions or behavior fall outside of expected bounds for example. In the case of a period of long and unexpected inactivity by the PWDD subscriber for example, notifications may be sent to nominated Online Support heads 154 and/or Friends and Family Companion App Users 155. Similarly should system 200 operating conditions fall outside of Administrator-designated bounds then they may be notified automatically.

Figure 4:
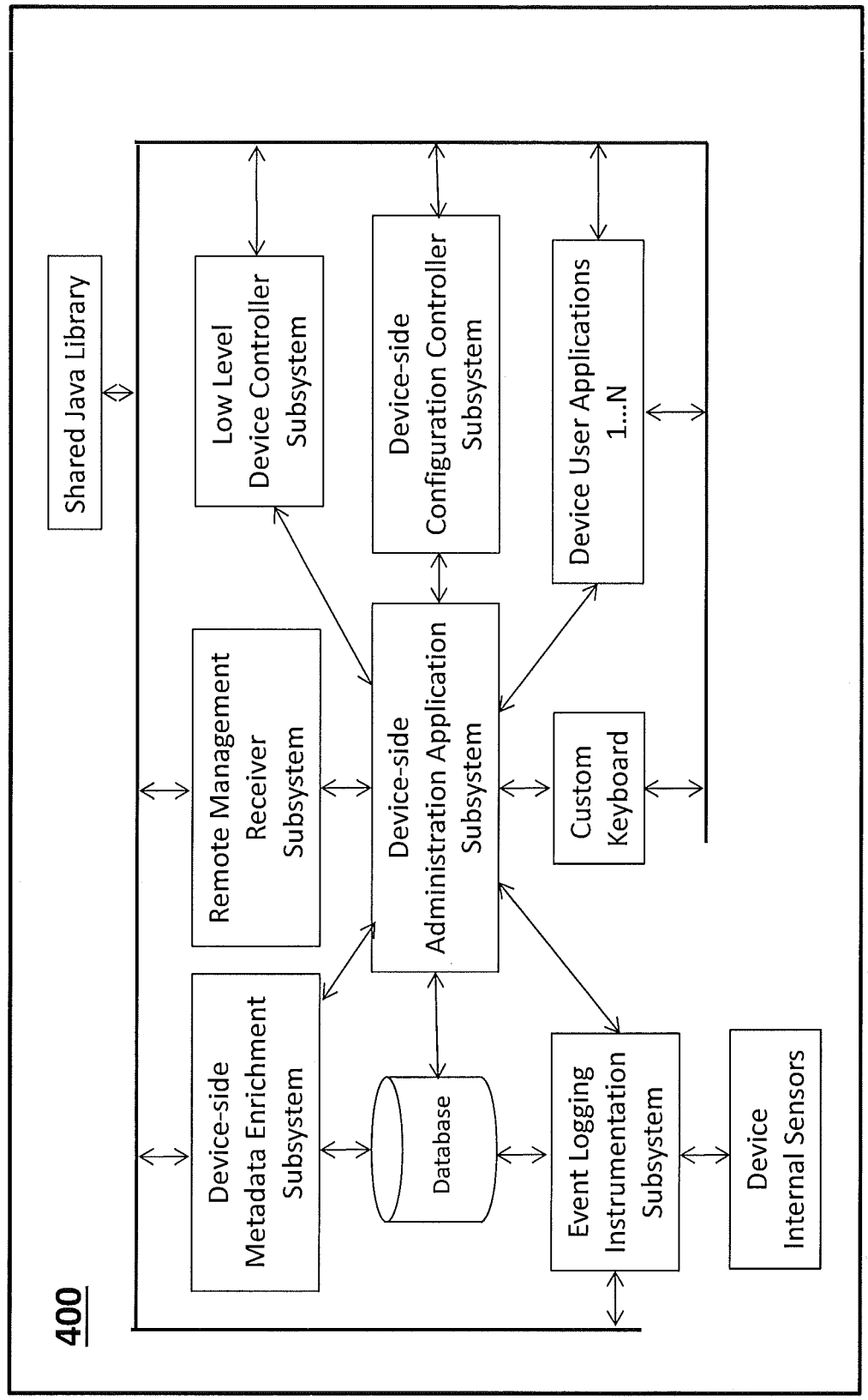
FIG. 4 is a high level schematic diagram illustrating an exemplary embodiment of components comprising a PWDD in accordance with the present invention.

The PWDD Configuration Control Subsystem 206 communicates with the PWDD Device-side Configuration Controller Subsystem shown in FIG. 4. to effect changes to the subscriber's PWDD. Such changes are typically effected to improve the user experience by considering subscriber user behavior, apparent successes, failures and compromises in task completion, together with environmental factors such as background noise, bright light conditions or anxiety on the part of the subscriber for example. Information about the Subscriber's capabilities considered by the PWDD Configuration Control Subsystem 206 may also be supplemented by encouraging the Subscriber User to participate in games or tests of capabilities such as reading from the PWDD screen, demonstrating understanding certain voice outputs, or demonstrating recollection capabilities and sensory motor control capabilities for example. The current state of the Subscriber User 50 may be characterized by the User Profile Management Subsystem 230 which maintains a compact representation of recent behaviors, context and performance indicators for each Subscriber User updated with low latency. These PWDD configuration changes may involve the application of rules and/or the computation of behavioral predictors made using Predictive Analytics Subsystem 234 that characterize the likely benefit of each specific PWDD interface configuration change, or set of candidate changes.

The Companion App Interface Subsystem 208 enables nominated Companion App Users 155 associated with a specific Subscriber User 50 privileged access to share content and to communicate with that Subscriber User. It is also involved in the passing of any notifications generated by the Notification Engine 204 that may need to be directed to nominated Companion App Users.

The Notification Engine 204 may be used to escalate notifications according to a rule-based schedule such that the Subscriber User is notified if their PWDD device battery level falls below a given level. The schedule may for example initially send a text message to the PWDD Subscriber User; if no action is taken and the battery continues to discharge then a voice call reminder to the Subscriber User might be initiated, and if that still fails then Companion App Users 155 or Online Support 154 associated with the Subscriber User in question may be alerted by text or email say such that interruption to the Subscriber User's service will be avoided if possible.

The Subscriber PWDD User Interface Subsystem 210 enables and conditions all outbound communications being sent to PWDDs 400 from System 200, and interprets all incoming communications from PWDDs 100 for acceptance into the System 200 and handles the passing of components of those communications to specific functional components of System 200 that may be required.

Each PWDD Subscriber User is given a new email address. Email Interface Subsystem 212 contains a System email server component and conditions incoming emails for Subscriber Users 50 first by checking whether the originator is on the approved "White-List", then stripping photographic, video or other attached materials and conditioning them into standard presentation formats for passing to PWDDs. In the reverse direction outbound content designated as email content by a PWDD is conditioned and sent to the desired destination email address via the Email Interface Subsystem 212.

The Reporting Analytics Subsystem 224 accesses historical interaction data from the Database 242 and performs various types of analytic activities such as aggregation, analysis of two or three dimensions of behavior to present as two or three dimensional graphic representations, processing and presentation of standard management reports about all types of system users and system performance, and the generation of specific analytic views on demand. The system may also provide more detailed analytic capabilities such as correlation analyses, tests of statistical significance, chi-squared analyzes, univariate modeling capabilities, ranking of statistical relationships between a selected dependent variable and a set of independent variables by percentage of variance explained, and other types of analyses as required by Administrators 151, Marketing Administrators & Managers, Partners an Sponsors 157, Online Support 154 and Analysts, Statistical Modelers, Data Scientists 152, Friends and Family Companion App Users 155 and for Subscriber Users 50.

The Recommendation Analytics Subsystem 226 is used to recommend related content or products that are predicted to be of interest or utility to Subscriber Users 50 based on their recent content interactions. These content or products may be recommended from content or product references already stored within the system Database 242, or from external sources. The content and product recommendation activity forms part of an administration capability by the system that is intended to increase subscriber breadth and depth of engagement, and increase the perceived benefit of all aspects of the service.

The Rules Management Subsystem 228 plays a role in the control of marketing activities. It is common for marketing campaigns to have certain constraints or bounds within which the marketing content either must, or must not, be displayed. For example there may be a budgetary maximum constraint related to the cost of running a specific campaign, or specific reach criteria associated with campaigns, or rules that dictate which segment or segments of Subscriber Users 50 should be included of excluded from particular campaigns, or rules that define specific qualifying criteria for a particular type of offer say. Different parts of the Rules Management Subsystem 228 may be siloed for exclusive use by particular user groups such as Marketing Administrators & Managers, Partners and Sponsors, or to Administrators 151, or to Online Support 154 say.

The User Profile Management Subsystem 228 allows the definition of a set of behavioral and contextual and sensory descriptors that characterize the current state of a Subscriber User, and the management and updating of that set of descriptors in such a way that it efficiently discriminates user needs, interests, intent, engagement and sometimes also health. This set of descriptors is also known as a "Profile" and is defined and under the management control of Analysts & Statistical Modelers, Data Scientists 152. The Profile Management Subsystem 228 also allows the definition and management of digital content descriptors such as those that characterize text content, or voice content, or video content, or music content say. Some of these descriptors may employ characterizing variables that are generated by other systems such as the Text Analytics Subsystem 236, or from external lookups, such as IP Lookup services, Geodemographic Lookup Services, or Music Lookup Services say.

Instrumentation Event Processing Subsystem 232 accepts events sent from subscriber PWDDs 400, from any other user interactions with the system, and from system internal events that are generated periodically to characterize system usage and performance such as memory and CPU usage and service latencies for example. Within each event there are attributes that characterize that event. The Instrumentation Event Processing Subsystem extracts attribute fields, and standardizes the event format with a date/time stamp for recording in the Database 242.

The Predictive Analytics Subsystem 234 takes records of profiles, that characterize the state and context of a Subscriber User at a given moment, together with one or more target variables to be modeled such as whether the Subscriber User clicked on a given presented marketing promotion, and can create a multivariate predictive model capable of robustly predicting the expected values of those target variable(s) given a new profile record that defines the state of a given Subscriber at a given moment. The Predictive Analytics Subsystem is capable of performing exploratory analysis on new data sets in batch offline mode for supporting the development of new predictive models, and is capable of deploying models to the production environment for real time scoring and appraisal of new marketing opportunities. The models used for scoring that are created offline from batches of data records may be continuously or periodically monitored for drift, and periodically updated dependent on the rate of drift or with fixed periodicity. The types of models used for capturing the understanding of behavior may be logistic regression, decision-trees, random forest or other commonly used statistical modeling approaches that are suitable for a batch offline modeling and validation methodology; or the models may be established and operated as large scale online learning processes using distributed machine learning approaches which may involve a combination of gradient descent and exploration/exploitation management for example. In most cases the modeling methods and scoring methods will employ parallelized processes that permit reliable appraisal of new profile scenarios and updating of the statistical models at rates that may involve many tens of thousands of records per second and be capable of delivering those appraisals for incoming new records with low latency in production mode.

Text Analytics Subsystem 236 is used to create characterizing descriptive variables for all types of text content that are sent to or from PWDD Subscriber Users 50. Speech-to-Text Conversion Subsystem 238 is used for automated text captioning for those PWDD Subscriber Users 50 with compromised hearing or to create text records of conversations for those PWDD Subscriber Users with compromised memory for example. The Speech-to-Text Conversion Subsystem is also used to generate text records of audio content as a preprocessing step to permit characterization of such content using the Text Analytics Subsystem 236.

The Marketing Optimization Subsystem manages the delivery of marketing and other digital content in a way that most beneficially satisfies the constraints, demands and trade-offs involved in meeting the various marketing campaign obligations as defined by Marketing Administrators & Managers, Partners and Sponsors 157, as well as those obligations that may have been accepted from External Marketing Systems and RTB Exchanges for example.

Database 242 stores event data generated from PWDDs 400, event data generated by interaction from other system users, event data generated by the system itself as monitoring activities, marketing content, lookup tables that store the descriptive meta-data generated by the Media Metadata Enrichment Subsystem 248 for each piece of content received or sent to a PWDD, lookup tables relating to Geodemographics or Product SKU's say, metadata that describes predictive model specifications, digital marketing content available for serving, marketing content serve and response event data, data tables configured for efficient generation of frequently accessed management reports, and any other data required to be stored by the system.

The Database 242 may implemented using various database technologies, such as relational databases, NoSQL databases (such as Hadoop/HBase or MongoDB), flat file databases, excel spreadsheets, comma separated values, etc.

possibly using highly scalable and distributed structures. If the Database 242 is implemented using relational database technology, the Database 242 may be configured to further store relationships between various data records. The storage Database 242 may be implemented using various hardware of software technologies, such as solid state or hard disk drives, redundant arrays of independent disks, cloud storage, virtual storage devices, etc.

Campaign Management Subsystem 244 enables marketing campaigns to be defined with start and stop times and dates, static, animated or video display content to be associated with specific marketing campaigns, the definition of target groups, operational bounds in terms of budget, frequency and reach, and other campaign controls typically associated with marketing campaign management. The Campaign Management Subsystem 244 may also synchronize with authorized External Marketing Systems and authorized RTB Exchanges either on demand or periodically.

The Media Metadata Enrichment Subsystem 246 manages the enrichment of incoming event data generated by PWDDs and content sent to and from PWDDs such that the observed interaction event data can more powerfully characterize the needs, interests and intent of the PWDD Subscriber Users 50. Where metadata is to be assigned to content then the Media Metadata Enrichment Subsystem assigns a unique identifier to the piece of content, and then generates a record in a Look-up table containing descriptive metadata for that content. This metadata can then be conveniently referenced each time an event is observed that involves that piece of content. For example an email may be analyzed by the Text Analytics Subsystem and characterized in terms of word counts, sentiment, semantics, or product mentions say. This information may be used as characterizing metadata for that particular piece of text content that may be indicative of the interests, needs or intent of the PWDD Subscriber User 50 when they read that content, say.

The Asynchronous Business Logic Controller Subsystem 248 controls the various system activities which are typically distributed across multiple servers and providing multiple types of functionality in a coordinated manner. The Asynchronous Business Logic Controller also manages graceful and prioritized failover such that the system continues to operate with least degradation in service in the event of the various possible failure types such as hardware failures, or operating under excessive loads, for example.

Administrators 151 control the periodicity of content synchronization between the Subscriber PWDD 400 and the system Database 242 that may contain incoming content that is being staged, pending synchronization with the Subscriber PWDD or may trigger a synchronization event manually. Database 242 is also a backup archive of all content currently held on the Subscriber's PWDD and may be fully restored by Administrators 151 or Online Support 154 in the event of corruption or failure of the PWDD 400.

External System Voice Call Service Provider can be a provider such as Twilio, such party may also provide embedded technology to operate on the PWDD 400. External System Video Calling Service Provider can be a party such as OpenTok.

The Social Media Integration Subsystem 250 may be configured for integration with one or more social media platforms, such as Facebook, LinkedIn, Twitter, MySpace, etc. In some embodiments, social media integration subsystem 250 may also integrate with these platforms to provide functionality such as the ability to access and acquire details of contacts relating to a PWDD Subscriber User 50 to assist in the setting-up of their contacts, to initiate postings, to send messages, and to access and acquire new postings that have been shared with them on these social media platforms. In some embodiments, the Subscriber User 50 may have the ability to invite one or more contacts to utilize the system. The Subscriber User 50 has the ability to call Online Support 154 directly by way of voice, video, email, text, or chat 24 hours a day.

FIG. 4 is a high level schematic diagram illustrating an exemplary embodiment of components comprising the PWDD 400 in accordance with the present disclosure. The Remote Management Receiver Subsystem permits and manages secure access by Administrators 151 and Online Support 154 to a Subscriber User's PWDD. The Custom Keyboard supports different keyboard layouts such as fewer special keys, or larger fonts and more widely spaced characters, in accordance with instructions received via the Device-side Configuration Controller Subsystem. The Device-side Configuration Controller Subsystem receives instructions from the Subscriber PWDD User Interface Subsystem 210 and enables the PWDD to be configured in such a way as to support more satisfying and efficient activities for the Subscriber Users 50. Several Device User Applications may be installed such that the PWDD supports the subscribed services of the Subscriber User 50. There also exists a Device-side Metadata Enrichment Subsystem that can be activated in idle times to enrich Content by performing activities similar to those performed by the Media Metadata Enrichment Subsystem 246 but operating on the PWDD 400. The Metadata attributes created by these device-side enrichment activities are sent back to the central Metadata Enrichment Subsystem 246. The PWDD device contains internal sensors such as a GPS location service, accelerometers in three orthogonal directions, a barometric pressure sensor, a temperature sensor, a battery charge level sensor, front-facing and rear-facing cameras. The PWDD 400 also employs event logging instrumentation that generates characterizing events for every interaction made by the Subscriber User as he/she interacts with the device, or periodically during extended continuous activities such as consuming streaming media or reading electronic books or articles say. These events are either triggered directly by the user interaction or are triggered by time intervals. The PWDD also generates characterizing events that are not initiated by the user interaction such as low battery level indication events, when the end of a video play or audio track play occurs, or when the PWDD 400 receives new content or incoming communications say. The events are sent together with characterizing attributes such as date/time generated, the ID of the Application with which the Subscriber User is interacting, the interaction type, contextual information such as a set of device sensor states, the Unique ID of any content with which an interaction is taking place, to the Instrumentation Event Processing Interface Subsystem 232 over the Network 300.

Figure 7:
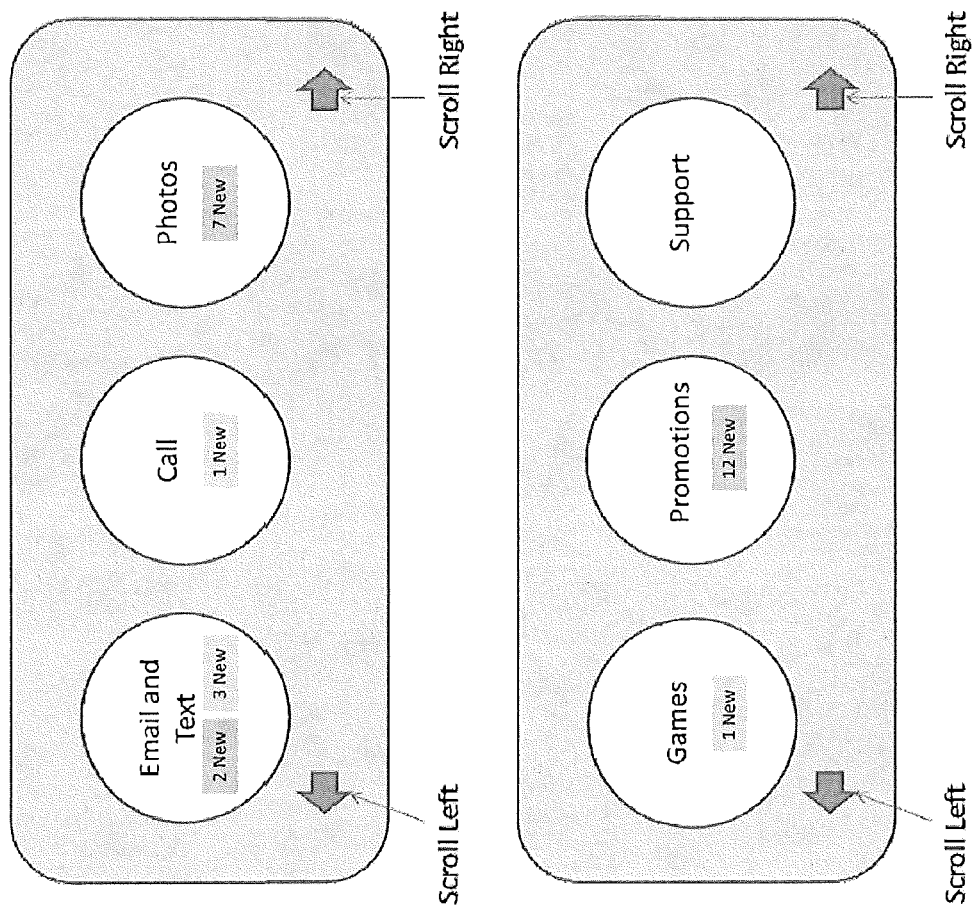
FIG. 7 illustrates an exemplary embodiment of a PWDD Home Screen in accordance with the present disclosure.

FIG. 7 illustrates an exemplary embodiment of a PWDD Home Screen in accordance with the present disclosure. The main interaction modes are clearly defined and have common, simple access means for the Subscriber Users 50. The user interface is simple, and has a configuration with least exposed functionality that enables the individual Subscriber User to perform their desired activities with a high level of satisfaction but with minimum complexity. The PWDD interface configuration may be different for different Subscriber Users, depending upon their observed capabilities, information disclosed during the set-up or management of their account by themselves, or by friends or family members, and is controlled by the PWDD Configuration Control Subsystem 206 which passes configuration instructions to the Device-side Configuration Control Subsystem on the PWDD 400. The Interface in FIG. 7 shows for each of the available supported activities, new content that has arrived either from their contacts, or as promotional content. If the Subscriber User opens a particular activity such as Email and Text, then the notifications of new content are reset to zero and disappear.

Figure 8:
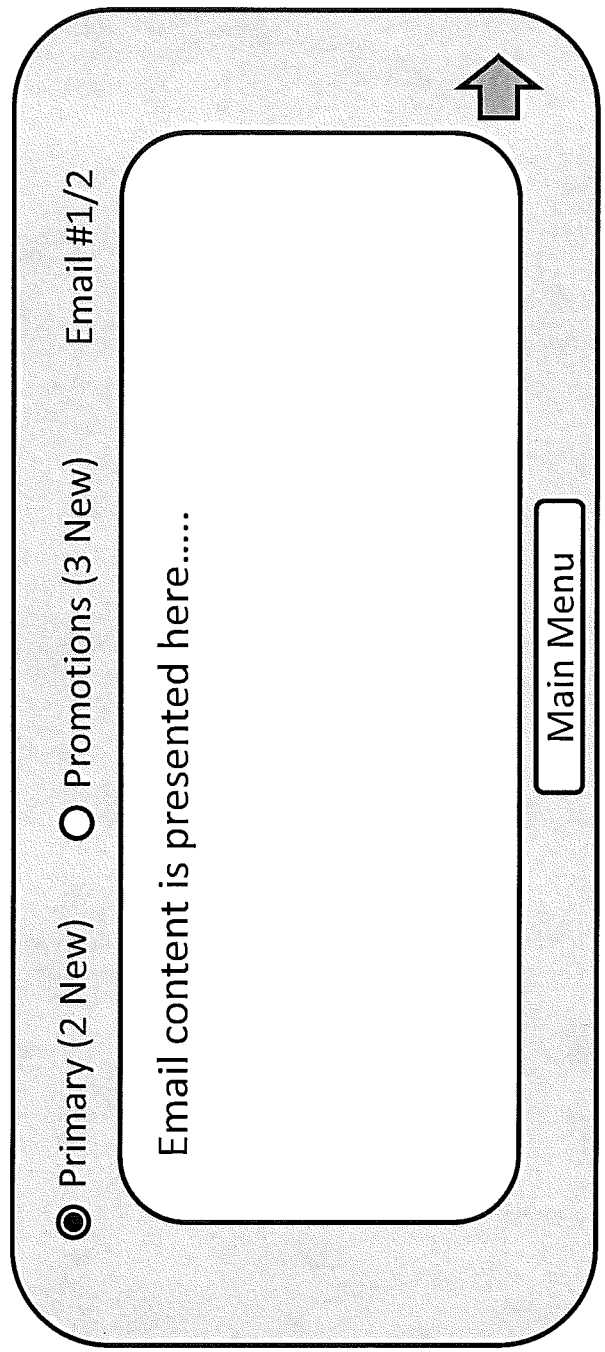
FIG. 8 illustrates an exemplary embodiment of a PWDD email access screen, according to the present disclosure.

FIG. 8 illustrates an exemplary embodiment of a PWDD email access screen, according to the present disclosure. As illustrated in FIG. 8, newly arrived content relating to a particular media type such as Email are separated so that email content that arrives directly from Subscriber User contacts appears by default in a primary view, and is separated from emails that arrive as promotional emails. This minimizes the intrusion for the Subscriber Users 50 while providing easy access to promotional email content should the Subscriber User wish to see it.

Figure 9:
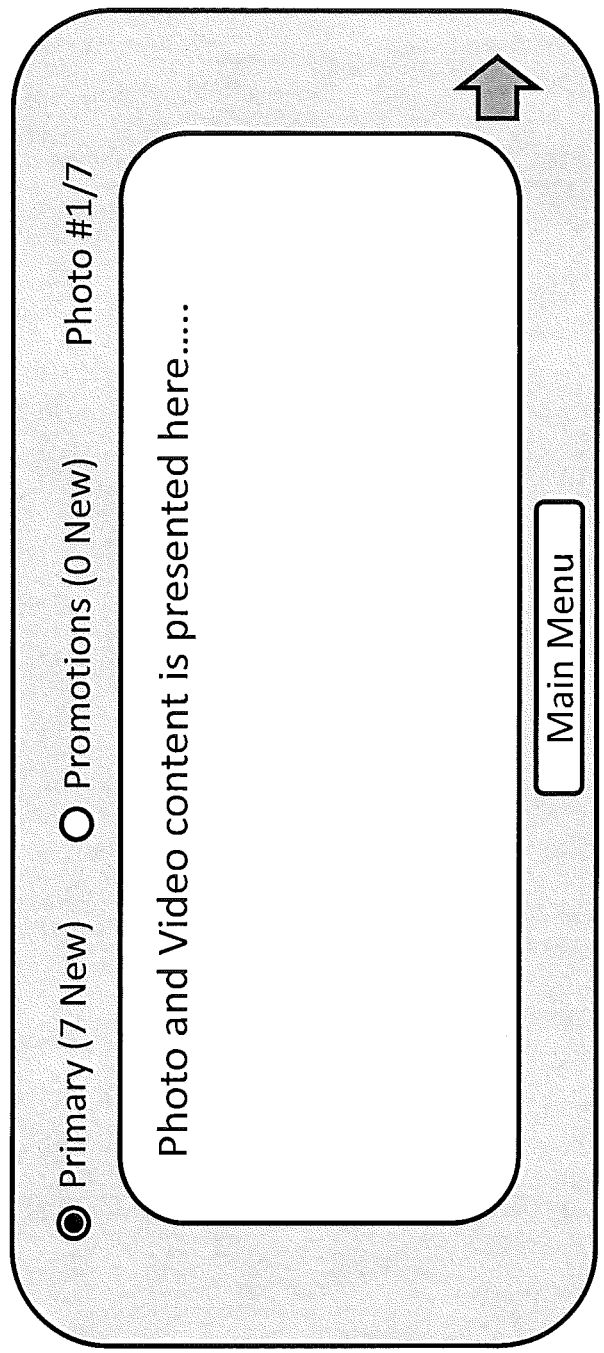
FIG. 9 illustrates an exemplary embodiment of a PWDD photo and video access screen, according to the present disclosure.

FIG. 9 illustrates an exemplary embodiment of a PWDD photo and video access screen, according to the present disclosure. As illustrated in FIG. 9, newly arrived content relating to a particular media type such as Photos and Videos are separated so that Photos and Videos content that arrives directly from Subscriber User contacts appears by default in a primary view, and is separated from Photos and Videos that arrive as promotional content. This minimizes the intrusion for Subscriber Users 50 while providing easy access to promotional Photographic and Video content should the Subscriber User wish to see it.

Figure 5:
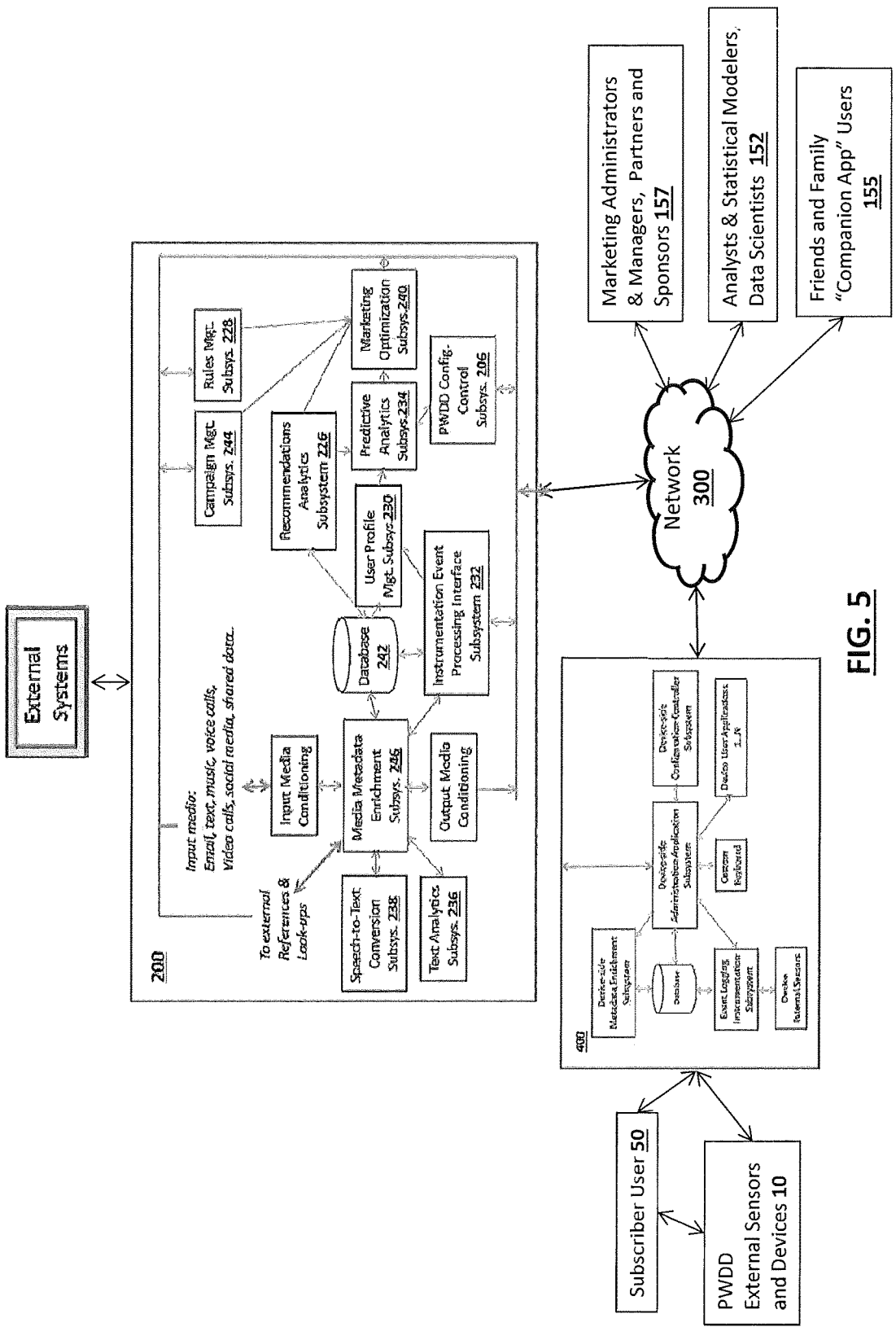
FIG. 5 is a high level schematic diagram illustrating an exemplary embodiment of principal components comprising a marketing enablement functionality, according to the present disclosure.

FIG. 5 is a high level schematic diagram illustrating an exemplary embodiment of principal components comprising a marketing enablement functionality, according to the present disclosure. The invention is configured to provide a platform that enables and manages efficient communication and content sharing with and between PWDD Subscriber Users, enhanced communication and content sharing between those PWDD subscribers and nominated Friends and Family members, capture of rich behavioral data relating to those PWDD subscribers across a range of supported communication and content sharing modes, analysis of captured behavioral and contextual data from those PWDD subscribers for the purposes of controlling the delivery marketing content into specific interface locations on the subscribers' PWDDs such that the relevance and timing of the marketing is of known quality, the display of the marketing content is controlled to engage rather than intruding and compromising the user experience, and the yield performance of the marketing content is controlled.

The creation and support of a service that enables particularly convenient and engaging communication and content sharing on a PWDD with a simplified user-interface is the part of the proposition that provides an opportunity to observe rich behavioral and contextual understanding of the needs, interests, aspirations and intentions of the target audience, who would otherwise remain under-represented and of restricted access to digital marketers.

The creation and support of a service that enables particularly convenient and engaging communication and content sharing on a PWDD with a simplified user-interface is also a proposition that enables controlled access to be provided for selected partner revenue-generating channels via that interface such as to Amazon.com for shopping, or to paid media services such as Netflix or Pandora, for an audience that would otherwise remain under-represented and have restricted access to such services. PWDD user access to these services could be provided as additional activity icons for "Amazon" and "Netflix" say, in a similar way to those icons shown in FIG. 7 for "Call", "Photos" and "Games" for example.

The creation and support of a service that enables particularly convenient and engaging communication and content sharing on a PWDD with a simplified user-interface as well as supporting remote monitoring via PWDD external Sensors and Devices 10 through that same device, provides an opportunity to monitor the health state of members of the user-audience, who in many instances would otherwise remain unwilling and not conveniently accessible to such digital remote healthcare monitoring. When desired, PWDD user access to remote health monitoring services could be provided as an additional activity icon for "Health" say, in a similar way to those icons shown in FIG. 7 for "Call", "Photos" and "Games" for example.

The marketing infrastructure components shown in FIG. 5 are the components that capture and convert this real time interactive understanding of these Subscriber User consumers into high-value marketing opportunities, and which may realize monetary gains that can then be used to subsidize the service to these Subscriber Users, or in some cases provide a service at no cost to the Subscriber User. The creation of a simplified and optimized service configured for users of low capability or interest, combined with attractive subsidized pricing presents a particularly strong proposition to drive adoption of the service.

All incoming digital content passes destined for Subscriber User's is analyzed by the Media Metadata Enrichment Subsystem, is given a unique ID, and is assigned descriptive attributes that characterize that content. Whether it is text-based, voice, music, video or photographic the content is analyzed. External look-up tables such as IP address Lookups, or Music, Book and Movie resources may be referenced externally to retrieve such attributes. For each piece of content that is sent to the Subscriber User's PWDD a record is generated and stored in the Database 242. That record contains the Subscriber User's PWDD ID, the reference Unique ID of the content, and one or more descriptor attributes.

RTB Exchanges and other External Marketing Systems may connect directly to the system Campaign Management Subsystem 244 through an API and campaign content and campaign activities may be defined and managed. Synchronization with such external systems may be automated periodic activities or manually triggered by authorized external users of such systems. Internal Marketing Administrators and Managers, and Partners and Sponsors 157 can access the Campaign Management Subsystem 244 and define and control marketing campaigns though an interface that connects to System 200 across the Network 300. The resulting set of marketing content is then served into the promotional slots on the Subscriber Users' PWDDs in accordance with the campaign definition, combined with any rules and constraints relating to each campaign, and in accordance with the high-level goals of the Marketing Optimization Subsystem 240, as defined by Analysts & Statistical Modelers, Data Scientists 152.

As the Subscriber Users 50 go about their communication, content consumption and gaming activities on their respective PWDDs the Event Logging Instrumentation Subsystems on those PWDDs generate events with date/time stamps, unique event ids, and attributes that characterize each interaction. These events may be generated directly by the interaction of a User Subscriber, or may be generated after particular periods of time during continuous User Subscriber activities such as reading e-books say. They may also be generated by system events such as configuration changes made at the request of the PWDD Configuration Control Subsystem 206, or changes made to the software or administration settings made by Administrators 151, or by Online Support 154. Events will also be generated or periodically sampled from Health or vital sign monitoring sensors, from internal device sensors such as the GPS location service, whenever Content is sent to the Subscriber User's PWDD, whenever account settings are changed, Companion App Users 155 share something, whenever Social Media Integration Subsystem detects new content that has been shared, whenever contact details are changed, whenever incoming calls and texts and video calls are received, or whenever there is an event that could potentially be used to characterize and differentiate Subscriber Users from one another. These events are sent to and processed by the Instrumentation Event Preprocessing Interface Subsystem 232. Preprocessed events are then logged in the Database 242.

Analysts & Statistical Modelers, Data Scientists 152 define variables that are aggregations and transformations of event attributes. These variables are defined in the User Profile Management Subsystem 230 in such a way that they most strongly characterize and differentiate the state of one Subscriber User from another in terms of present needs, interests and intentions.

The User Profile Management Subsystem 230 manages the updating of the profiles of Subscriber Users such that the profiles are considered to accurately characterize the present state of the Subscriber Users 50. This activity may entail caching strategies, different update prioritization being assigned to different variables in the profile, and ensuring that profiles that are most likely to be requested are maintained in the most updated state and in a storage mechanism that permits fast retrieval. The User Profile Management Subsystem 230 also enhances attributes such as product SKU, IP address and consumed Digital Content with unique ID by retrieving the rich attributes that are stored in Database 242 and which were captured and logged as part of the activities of the Media Metadata Enrichment Subsystem 246.

Recommendations Analytics Subsystem 226 employs efficient analytical means to extract interests, products and content that has been exhibited by Subscriber Users which are most strongly correlated with other interests, products and content that have been exhibited by the same Subscriber Users. These strongly correlated item relationships are then logged in Database 242 and may be referenced rapidly and retrieved as references to candidate propositions or candidate pieces of curated content that can be sent to deepen engagement with the Subscriber User. The Recommendations Analytics Subsystem 226 maintains a set of analytical processes that are controlled by Analysts & Statistical Modelers, Data Scientists 152.

Analysts & Statistical Modelers, Data Scientists 152 interact with the Predictive Analytics Subsystem to build exploratory predictive models that produce one of more new variables that powerfully differentiate Subscriber Users. Where such predictive models are found to be useful they may be put into production in the Predictive Analytics Subsystem in a way that permits these models to be called to score new Subscriber User scenarios with low latency. Such predictive models may be of the supervised or unsupervised types and may be updated periodically in batch offline mode, or updated after a specific level of behavioral drift has been observed with respect to the model in question. Alternatively such predictive models may employ incremental learning approaches such as machine learning, whereupon the behavioral representation of the model is updated after each new Subscriber User event observation, or after a small set of new Subscriber User events have been observed.

Given the known state of a Subscriber User, as represented by his or her updated Profile, the modeled behavioral representations of Subscriber Users that predict likely outcomes under specific scenarios and correlated content of interest, the known availability of digital marketing content as defined in the Campaign Management Subsystem 244, the operating rules and constraints as defined in the Rules Management Subsystem 228, and the high level goals as defined in the Marketing Optimization Subsystem 240, then given the availability of specific marketing slots on the subscriber's PWDD the Marketing Optimization Subsystem 240 determines which specific marketing promotions or content should be displayed in which marketing slots and at what time.

Given the known state of a Subscriber User, as represented by his or her updated Profile, the modeled behavioral representations of Subscriber Users that predict likely outcomes under specific scenarios, the operating rules and constraints as defined in the Rules Management Subsystem 228, the Notification Engine 204 may initiate a notification using a specific communication channel such as text, email or voice to notify the Subscriber User, to notify an Administrator 151, or to notify one or more nominated Companion App Users 155, or to notify Online Support 154, at any given time, according to the level of importance.

The performance of the marketing activities can be seen by Marketing Administrators & Managers, Partners and Sponsors 157, Analysts & Statistical Modelers, Data Scientists 152a . . . 152n and External Marketing Systems that may be connected via API as performance reporting output generated by the Reporting Analytics Subsystem 224.

The following describes potential optimization and enhancements that may be practiced in regards to some embodiments of the invention. There may be other, different, modifications of the below potential optimizations and enhancements, and it should be understood that the description is provided as non-limiting, illustrative examples only. For example, there may be additions, omissions, modifications, and other implementations may be considered.

In some embodiments of the invention, the System 200 or some of its subsystems may be implemented through a set of distributed computing devices connected through a communications network. An example of such a set of distributed computing devices would be what is typically known as a 'cloud computing' implementation. In such a network, a plurality of connected devices operate together to provide services through the use of their shared resources.

A cloud-based implementation may provide one or more advantages including: openness, flexibility, and extendibility, manageable centrally, reliability, scalability, being optimized for computing resources, having an ability to aggregate and analyze information across a number of users, ability to connect across a number of geographical areas and use multiple mobile or data network operators for network connectivity. While embodiments and implementations of the present invention may be discussed in particular non-limiting examples with respect to use of the cloud to implement aspects of the system platform, a local server, a single remote server, a software as a service platform, or any other computing device may be used instead of the cloud.

Figure 6:
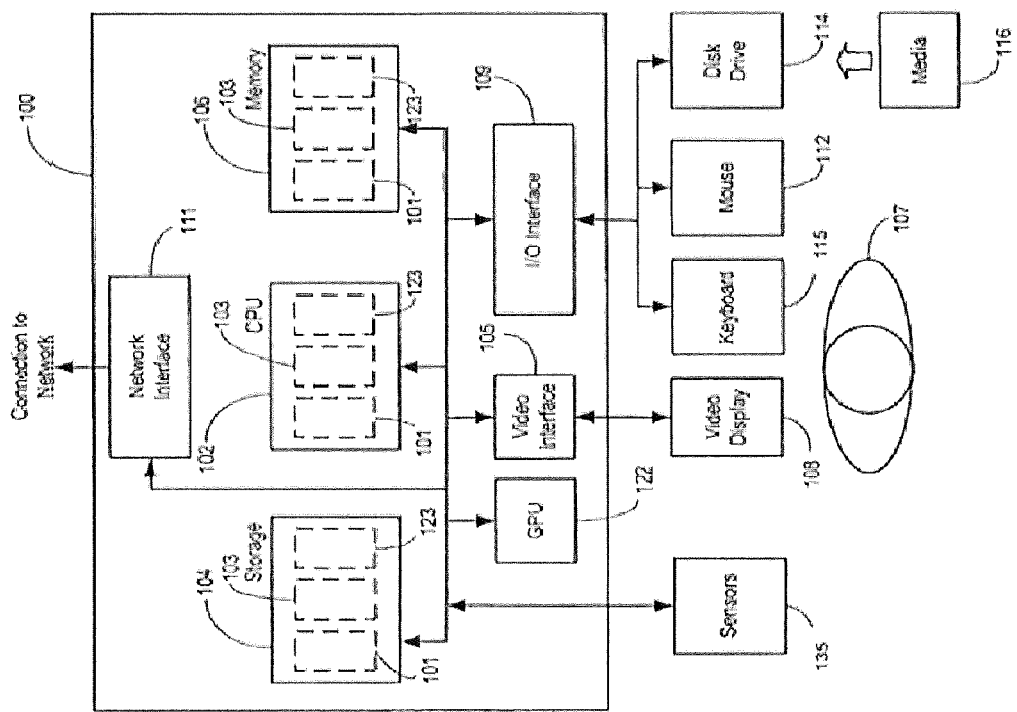
FIG. 6 is a diagram illustrating an exemplary embodiment of a computer hardware and software in accordance with the present disclosure.

The present system and method may be practiced in various embodiments. A suitably configured computer device, and associated communications networks, devices, software and firmware may provide a platform for enabling one or more embodiments as described above. By way of example, FIG. 6 shows an exemplary computer device 100 that may include a central processing unit ("CPU") 102 connected to a storage unit 104 and to a random access memory 106. The CPU 102 may process an operating system 101, application program 103, and data 123. The operating system 101, application program 103, and data 123 may be stored in storage unit 104 and loaded into memory 106, as may be required. Computer device 100 may further include a graphics processing unit (GPU) 122 which is operatively connected to CPU 102 and to memory 106 to offload intensive image processing calculations from CPU 102 and run these calculations in parallel with CPU 102. An operator 107 may interact with the computer device 100 using a video display 108 connected by a video interface 105, and various input/output devices such as a keyboard 115, mouse 112, and disk drive or solid state drive 114 connected by an I/O interface 109. In known manner, the mouse 112 may be configured to control movement of a cursor in the video display 108, and to operate various graphical user interface (GUI) controls appearing in the video display 108 with a mouse button. The disk drive or solid state drive 114 may be configured to accept computer readable media 116. The computer device 100 may form part of a network via a network interface 111, allowing the computer device 100 to communicate with other suitably configured data processing systems (not shown). One or more different types of sensors 135 may be used to receive input from various sources.

The present system and method may be practiced on virtually any manner of computer device including a desktop computer, laptop computer, tablet computer or wireless handheld. The present system and method may also be implemented as a computer-readable/useable medium that includes computer program code to enable one or more computer devices to implement each of the various process steps in a method in accordance with the present invention. In case of more than computer devices performing the entire operation, the computer devices are networked to distribute the various steps of the operation. It is understood that the terms computer-readable medium or computer useable medium comprises one or more of any type of physical embodiment of the program code. In particular, the computer-readable/useable medium can comprise program code embodied on one or more portable storage articles of manufacture (e.g. an optical disc, a magnetic disk, a solid state storage device, etc.), on one or more data storage portioned of a computing device, such as memory associated with a computer and/or a storage system.

The PWDD application of the present invention may be implemented as a web service, where the mobile device includes a link for accessing the web service, rather than a native application. The functionality described may be implemented to any PWDD platform, including, but not necessarily limited to, the iOS™ platform, ANDROID™, WINDOWS™ and BLACKBERRY™.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A digital marketing system, the system comprising: a portable electronic device, the portable electronic device comprising: at least one processor; at least one memory; a plurality of sensors configured to gather sensor data; and a digital marketing application loaded into the at least one memory and executed by the at least one processor, the digital marketing application instructing the at least one processor to generate;
   a simplified user interface displayed on the portable electronic device that upon execution by the processor:
      formats one or more user applications into a user-specific formatted display wherein the user-specific formatted display includes: a customized keyboard wherein the options for customizing the keyboard are based upon a user-specific need determined through a set-up process and are to display fewer special keys, provide a larger font size, and allow for more widely spaced characters; and a reduced option interface that limits the amount of selectable options based upon the user ability results determined through the set-up process;
      parses user data and promotional enriched media; and
      displays both the parsed promotional enriched media data and user data as separate categories within one or more user applications configured to display through the simplified user interface;
   an instrumentation subsystem that upon execution by the processor,
      collects and stores into the at least one memory, event data including date and time stamps, unique event identification codes associated with particular events, attributes associated with each interaction, interaction and behavioral data from the simplified user interface, intent prediction data, expected advertising performance data, and other user-characterizing data from the portable electronic device;
   a remote management receiver subsystem that upon execution by the processor,
      provides limited access to one or more additional users for further configuring of the digital marketing application including adjusting one or more features of the simplified user interface;
   a device-side metadata enrichment subsystem that upon execution by the processor
      processes media during lower-processing periods and uploads the processed media to the plurality of digital marketing servers for use by a media metadata enrichment subsystem;
   a device-side administration application subsystem that upon execution by the processor,
      provides remote access to upload updated user profile data and download event data to one or more system administrators; and
   a plurality of digital marketing servers, the digital marketing servers comprising: at least one server processor; at least one memory; and a digital marketing server application loaded into the at least one memory and executed by the at least one server processor, the digital marketing server application instructing the at least one processor to generate a user profile management subsystem that upon execution by the at least one server processor:
creates a unique identification number for each user;
adds configuration controls that are utilized to personalize the simplified user interface; and
store one or more differentiating variables associated with the user within a server database;

a remote management subsystem that upon execution by the at least one server processor
provides access to a plurality of portable electronic devices and
provides limited access to one or more additional users for further configuring of the digital marketing applications and downloading of event data from the portable electronic devices;

a media metadata enrichment subsystem that upon execution by the at least one server processor:
downloads event data from the portable electronic device via the remote management receiver subsystem;
receives a plurality of media for processing;
assigns a unique identifier to each of the plurality of media
assigns the assigned unique identifier to an entry within a look-up table;
associates one or more descriptive metadata to one or more entries within the look-up table;
provides quick access to metadata based on a given identifier; and
stores all media sent to a user, along with the unique id of the user and associated metadata within the server database;

a text analytics subsystem that upon execution by the at least one server processor:
parses one or more received text-based media for word counts, semantics, sentiments, and consumer product mentions;
identifies one or more characterizations within the parsed text
selects one or more metadata for association based on the characterized text;

an administrative support subsystem that upon execution by the at least one server processor can
configure the period of time between updates and synchronizations between the plurality of digital marketing servers;

a predictive analytics subsystem that upon execution by the at least one server processor:
receives event data downloaded from a user portable electronic device;
utilizes machine learning to analyze the received event data in near real-time to generate one or more new differentiating variables;
updates the user profile with the one or more newly generated differentiating variables; and
notifies one or more system administrators upon update of the user profile;

a campaign management subsystem that upon execution by the at least one server processor:
receives campaign data from one or more external campaign vendors;
generates promotion data for targeting to specific users;
determines one or more locations within the simplified user interface to display the promotion data based on user intent prediction data and the received campaign data; and a reporting subsystem that upon execution by the at least one server processor,
generates report data on the instances of display, response, and financial performance of the digital content and promotions data over a predefined period of time;

wherein the portable electronic device:
provides the user with one or more tests to determine ability levels;
generates user profile data based on the responses received from the one or more tests;
transmits the generated user profile data to the user profile management subsystem within the plurality of digital marketing servers for processing;
configures a customized simplified user interface based on the user profile data including a customized keyboard and reduced options interface;
provides one or more options for additional users to adjust the simplified user interface through the remote management receiver subsystem;
displays media with enriched metadata in near real time by:
receiving enriched media and metadata from the plurality of digital marketing servers wherein the enrichment is generated by one or more media metadata enrichment subsystems;
display the received enriched media through one or more customized simplified user interfaces based on the received metadata;
generating event data in response to the actions taken by a user in response to the displayed enriched media;
determining if additional enriched media has been received for display after a pre-determined amount of time configured by one or more system administrators;
uploads, through the device-side administration application subsystem, generated event data to one or more system administrators;
receives additional enriched media with metadata from the plurality of digital marketing servers by the servers:
determining, through the predictive analytics subsystem, if the user is associated with one or more new differentiating variables;
updating the user profile data with new user profile data in response to one or more new differentiating variables being generated;
receiving, through the campaign management subsystem, updated campaign data that is processed to promotions data;
determining, through the campaign management subsystem, if the updated promotions data is relevant to one or more users;
enriching the promotions data with metadata to generate enriched media;
transmitting the enriched media and metadata to the portable electronic device for display;
parses the additional received enriched media and metadata; and displays the additional enriched media within one or more simplified user interfaces based on the associated metadata.

\* \* \* \* \*